US008176144B2

(12) United States Patent
McIntyre (10) Patent No.: US 8,176,144 B2
(45) Date of Patent: May 8, 2012

(54) PSEUDO REAL TIME INDEXING OF DIGITAL MEDIA FILES

(75) Inventor: Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 258 days.

(21) Appl. No.: 11/951,490

(22) Filed: Dec. 6, 2007

(65) Prior Publication Data

US 2009/0150519 A1 Jun. 11, 2009

(51) Int. Cl.
G06F 15/16 (2006.01)

(52) U.S. Cl. .......................................................... 709/218
(58) Field of Classification Search .................... 709/218
See application file for complete search history.

(56) References Cited

U.S. PATENT DOCUMENTS

| 6,687,696 | B2* | 2/2004 | Hofmann et al. ..................... 1/1 |
| 7,027,172 | B1 | 4/2006 | Parulski et al. |
| 7,328,216 | B2* | 2/2008 | Hofmann et al. ..................... 1/1 |
| 2002/0140843 | A1 | 10/2002 | Tretter et al. |
| 2003/0177124 | A1* | 9/2003 | Sauri ............................... 707/10 |
| 2006/0074771 | A1 | 4/2006 | Kim et al. |
| 2006/0294074 | A1* | 12/2006 | Chang .............................. 707/3 |
| 2007/0071290 | A1* | 3/2007 | Shah et al. ..................... 382/118 |
| 2007/0198746 | A1* | 8/2007 | Myllyla et al. ................. 709/248 |
| 2008/0313146 | A1* | 12/2008 | Wong et al. ........................ 707/3 |
| 2009/0052804 | A1* | 2/2009 | Lewis ........................... 382/298 |

FOREIGN PATENT DOCUMENTS

JP 2000259669 A * 9/2000

OTHER PUBLICATIONS

U.S. Appl. No. 11/935,737, filed Nov. 6, 2007, Newell et al.
U.S. Appl. No. 11/758,358, filed Jun. 5, 2007, Newell et al.
U.S. Appl. No. 60/870,976, filed Dec. 20, 2006, Arujunan et al.

* cited by examiner

Primary Examiner — Larry Donaghue
(74) Attorney, Agent, or Firm — Thomas J. Strouse; Raymond L. Owens (57) ABSTRACT

The present disclosure relates to a digital media files and technique for pseudo real time indexing of digital media files. The technique includes capturing at least one digital media file using a network enabled image capture device, connecting the network enabled image capture device to an indexing server over a network and transferring the at least one captured digital media file to the indexing server. The technique further includes indexing the at least one captured digital media file for producing indexed data associated with the at least one captured digital media file, transferring the indexed data associated with the at least one captured digital media file to the network enabled image capture device, and updating the at least one digital media file on the network enabled image capture device with the indexed data.

8 Claims, 6 Drawing Sheets

PSEUDO REAL TIME INDEXING OF DIGITAL MEDIA FILES

FIELD OF THE INVENTION

The present invention relates to digital media files and, more particularly, to pseudo real time indexing of digital media files.

BACKGROUND OF THE INVENTION

The current state of the art in semantic understanding of digital media files, commonly known as indexing, involves complex, computationally intensive algorithms and multimode models. This complexity translates to a significant amount of time required to successfully index a digital media file. Furthermore, digital media files, which will be understood to include digital video files, are captured on a network enabled image capture device that at some indeterminate time gets connected to a personal computer to transfer the captured media files.

With the Premier service from the Kodak EasyShare Gallery™, media files from phone cameras are transferred directly from the phone camera to a user account-based network storage and sharing service. In each of these scenarios, the entire digital media file is transferred for storage and sharing. To index these digital media files, a burdensome and deliberate series of steps must first occur. Furthermore, upon indexing digital media files that have been uploaded to the Kodak EasyShare Gallery, information learned from these files is not returned to phone camera. In addition, photo kiosks like the Kodak Picture Maker kiosks are often not installed on a broad communication network like the Internet.

There is a need for a system that immediately transfers a captured digital media file from a network enabled image capture device to networked image indexing server while conserving transmission bandwidth. There is a further need to accurately index each newly captured digital media file in view of previously captured digital medias files and apriori knowledge of the user submitting the digital media file. There is a still further need to return the indexed information to the network enabled image capture device to facilitate usefulness of the indexed digital media file on another unconnected device or system provided by an unrelated service provider. Another need exists that allows the network enabled image device to receive additional digital media files enabling it to transfer a plurality of digital media files to a photo kiosk for producing an image product and/or service where the kiosk is not connected to the same broad-based communication network or not part of the system of the primary capture device. There is a still further need to utilize the multiple radios of the network enabled image capture device to facilitate the transfer of a data packet stream between two devices that are not otherwise connected while protecting the security of the user.

SUMMARY OF THE INVENTION

In general terms, the present disclosure relates to a system and method for digital media files and, more particularly to pseudo real time indexing of digital media files.

One aspect of the present invention is a method for pseudo real time indexing of digital media files. The method includes capturing at least one digital media file using a network enabled image capture device, connecting the network enabled image capture device to an indexing server over a network, transferring the at least one captured digital media file to the indexing server, indexing the at least one captured digital media file for producing indexed data associated with the at least one captured digital media file, transferring the indexed data associated with the at least one captured digital media file to the network enabled image capture device, and updating the at least one digital media file on the network enabled image capture device with the indexed data.

Another aspect of the present invention is a method of producing an image product from content provided by a network enabled image capture device. The method includes transmitting a plurality of digital media files from the network enabled image capture device to a remote fulfillment center, each digital media file having metadata and indexed data, using the metadata and indexed data for automatically preparing for selection by a user an image product using at least one of the plurality of digital media files, and producing the prepared image product upon selection by the user.

Another aspect of the present invention is a method of producing an image product. The method includes presenting to a user an image product for selection on a network enabled image capture device, the network enabled image capture device having stored digital media files, transferring to the network enabled image capture device additional digital media files for producing the prepared image product upon selection by the user, the network enabled image capture device having sufficient memory to receive the transferred files, connecting to a remote fulfillment center using the network enabled image capture device and transferring one or more stored and one or more additional digital media files to the remote fulfillment center, and producing the selected image product using the transferred digital media files at the remote fulfillment center.

Another aspect of the present invention is a method of producing an image product from content provided through a network enabled image capture device. The method includes using metadata and indexed data associated with digital media files for automatically preparing for selection by a user an image product including at least one of a plurality of digital media files, and transferring at least one of a plurality of digital media files for producing the prepared image product upon selection by the user via a network enabled image capture device, the network enabled image capture device communicating with a remote server using a first communication technology and communicating with a remote fulfillment center using a second communication technology.

Another aspect of the present invention is a system for pseudo real time indexing of digital media files. The system includes a network enabled image capture device for capturing at least one digital media file, the network enabled image capture device, an indexing server coupled to the network enabled image capture device for receiving the at least one captured digital media file over a network and indexing the at least one captured digital media file for producing indexed data associated with the at least one captured digital media file, the indexing server transferring the indexed data to the network enabled image capture device, and a processor for updating the at least one digital media file on the network enabled image capture device with the indexed data.

BRIEF DESCRIPTION OF THE DRAWINGS

The invention may be more completely understood by considering the detailed description of various embodiments of the invention which follows in connection with the accompanying drawings. Referring now to the drawings in which like reference numbers represent corresponding parts throughout.

DETAILED DESCRIPTION OF THE INVENTION

Figure 1:
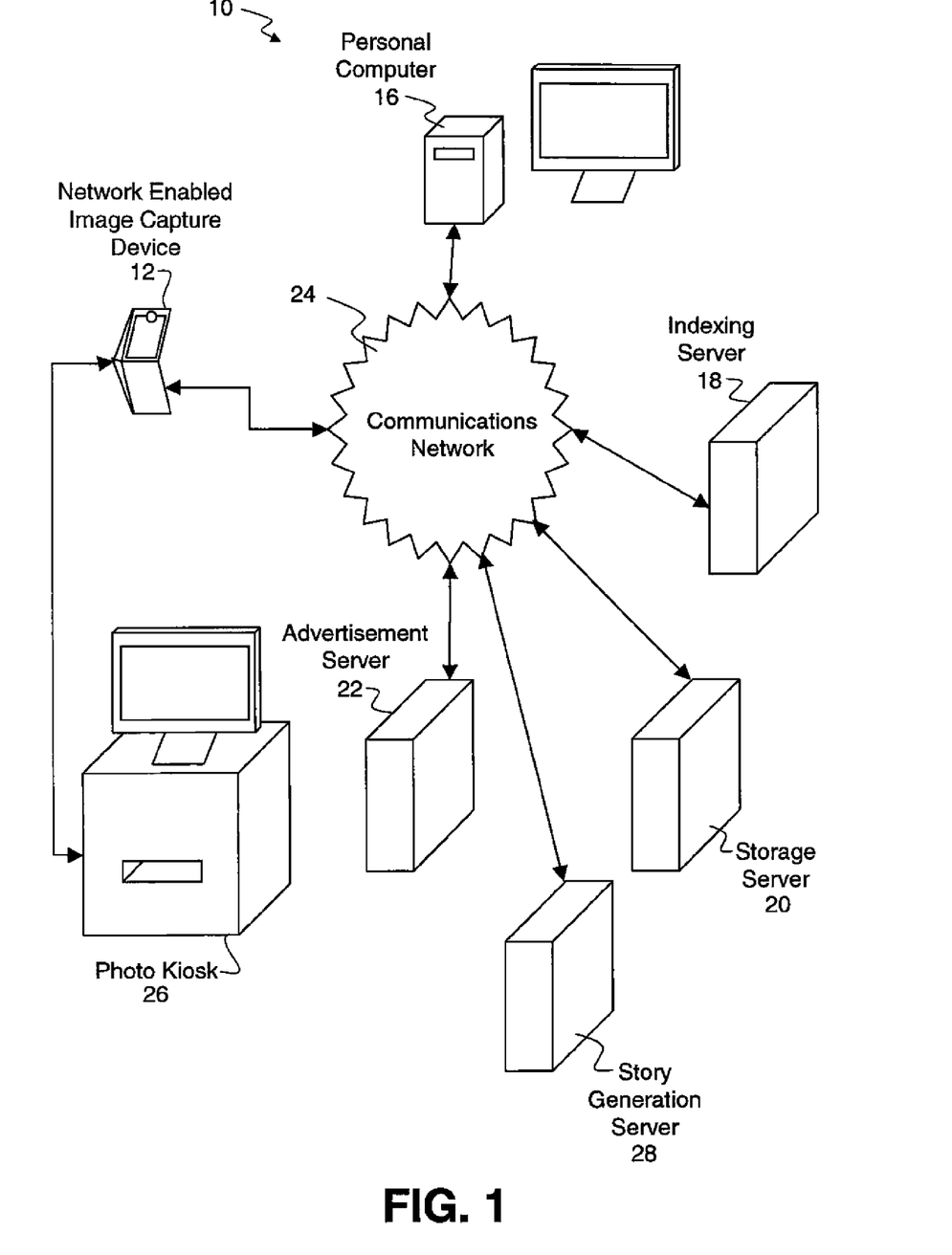
FIG. 1 illustrates a system for pseudo real time indexing of digital media files.

FIG. 1 illustrates a system for pseudo real time indexing of digital media files. In FIG. 1, the functional components for the system 10 described herein includes a network enabled image capture device 12 connected to an indexing server 18, a storage server 20, a remote fulfillment center or photo kiosk 26, a story generation server 28, and a personal computer 16 via a broad-based communications network 24 such as the Internet. The network enabled image capture device 12 can be by way of example, but not limited to, a mobile phone camera or a network enabled camera such as the Kodak EasyShare One™ that captures digital media files. Having a user identification code, a network enabled image capture device 12 can connect to a variety of devices connected to network 24. These devices can accept and process the transferred digital media files, store the transferred digital media files or otherwise operate on the transferred digital media files in association with the user by way of the user identification code. The user identification code can be a phone number, a user supplied alpha-numeric password, a computer generated number, a random number, or a code derived from a variety of numbers or codes to create a unique user identification code for representing a specific user to the variety of network connected devices. The user identification code will be understood to also include the combination of account identification and password to enable the network enabled image capture device 12 to authenticate the user to any account without the user having to repeatedly enter that specific data.

Network enabled image capture device 12 has a primary, independent communication technology such as conventional digital cellular technology (GSM etc) or via WIFI technology (802.11x) to connect to the communication network 24 and the photo kiosk 26. Additionally, network enabled image capture device 12 can use, but not limited to, a secondary, independent communication technology such as Bluetooth™ to communicate with a photo kiosk 26. Personal computer 16 can receive remote transmissions of digital media files from wireless capture device 12 as well as transmit digital media files to wireless capture device 12. With appropriate software, personal computer 16 can supply the computing functionality of storage server 20 and indexing server 18. Advertisement server 22 supplies semantically correlated advertisements upon request from indexing server 18 or personal computer 16 at any point in the workflow of transmitting indexed digital media files. Correlation of the supplied advertisement is a function of the indexing server 18 providing indexed data of a digital media file to the advertisement server 22.

Story generation server 28 operates on a plurality of digital media files. The digital media files are stored on storage server 20 and associated with a user through the user identification code using a series of rules for the purposes of rendering a potential image product or service representative of a story. The automatic generation of stories from semantically indexed digital media files is the subject of U.S. patent application Ser. No. 11/758,358 entitled "Automatic Story Creation Using Semantic Classifiers for Images and Associated Metadata" and U.S. patent application Ser. No. 11/935,737 entitled "Automatic Story Creation using Semantic Classifiers for Digital Assets and Associated Metadata", to Newell et al. and are hereby incorporated in their entirety by reference.

Figure 2:
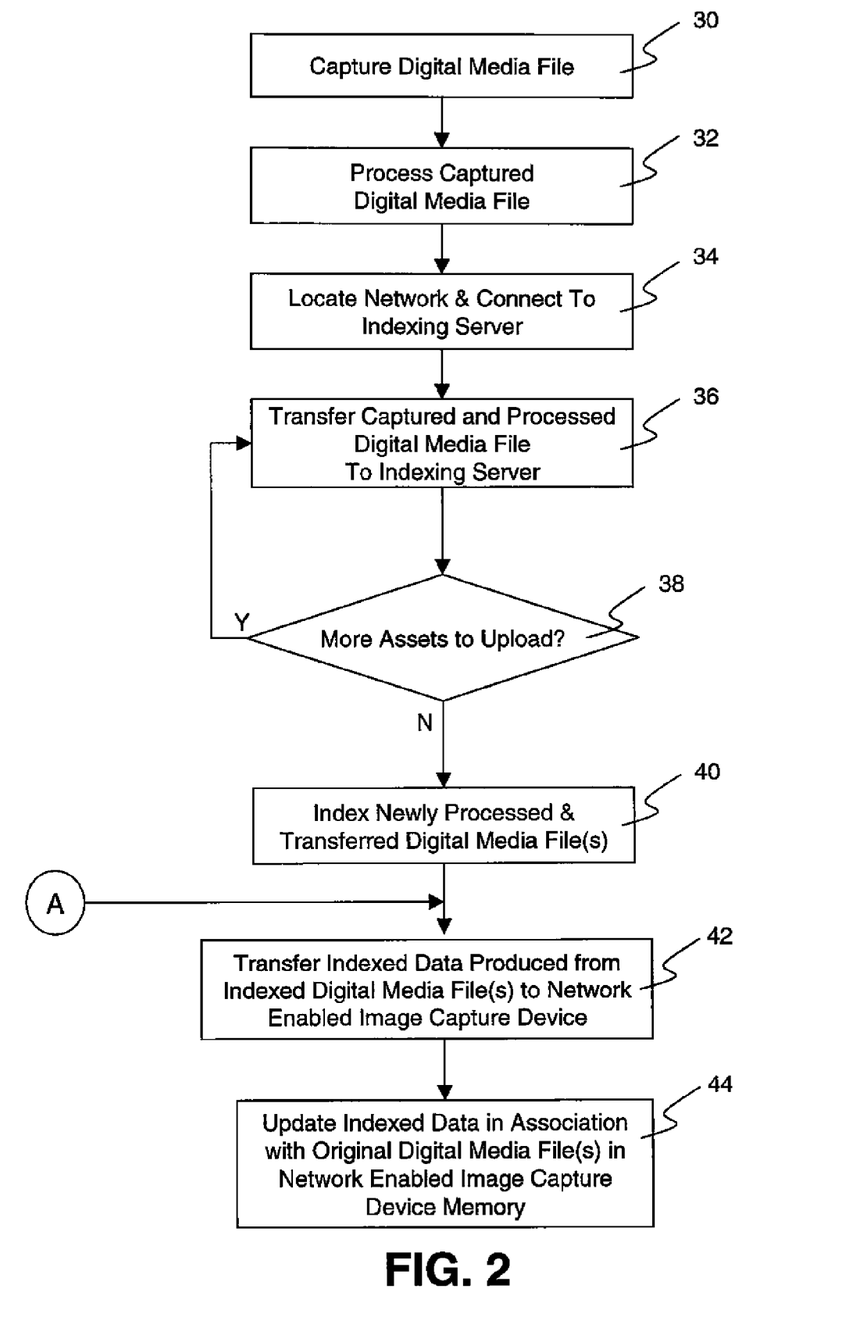
FIG. 2 is a flowchart illustrating one embodiment of pseudo real time indexing of digital media files.

FIG. 2 is a flowchart illustrating one embodiment of pseudo real time indexing of digital media files. In FIG. 2, beginning with the capture of a digital media file (step 30), the network enabled image capture device 12 processes the digital media file (step 32) and prepares the digital media file for remote indexing. Typically, network enabled image capture devices 12 capture high-resolution digital media files, which consume transmission bandwidth and take excessive time to transmit. Indexing server 18 requires substantially less resolution to satisfy the needs of typical indexing algorithms. Processing the digital media file (step 32) can therefore create a lower resolution copy of the original digital media file for uploading to indexing server 18. It should be noted that the processed digital media file will retain an association with the original digital media file to facilitate the transfer of the indexed data to the original digital media file that may be stored on storage server 20 as will be described with respect to FIG. 3 or within network enabled image capture device 12. Processing (step 32) can further include other forms of image processing such as color correction with algorithms such as available from the Kodak Perfect Touch™ processing. Correcting color can improve the accuracy of the indexed information resulting from color dependent indexing algorithms such as grass, blue sky, clouds etc.

Once the image has been processed (step 32), the network enabled image capture device 12 locates an available network (step 34) and transfers the processed digital media file to the indexing server 18 (step 36). The network enabled image capture device 12 may contain user identifying information that can be used to identify the user for the purposes of storing the indexed data along with the processed and transferred digital media file in association with a user account on storage server 20 (step 42). After any additional images are transferred to indexing server 18 (step 38), indexing server 18 indexes (step 40) the processed and transferred digital media file(s) using any appropriate combination of semantic indexing technologies such as scene classifiers (beach, sunset, indoor etc), material classifiers (rock, sand, glass, water etc), object detectors and recognizers, event detectors and recognizers, people detectors and recognizers, or any other indexing technology useful in providing semantic understanding of the content of a digital media file. The process of semantically indexing a digital media file therefore produces indexed data associated with the digital media file. The indexed data is by nature probabilistic data. In other words, the indexed data for a digital media file having an applied beach scene classifier is the probability that the digital media file has a beach scene. As opposed to index data, metadata is information provided by a camera or a user and not inferred.

At some point after the indexing (step 40) in the operation of system 10, the indexed data produced for each digital media file is transferred (step 42) or returned to the memory of the network enabled image capture device 12. Returning the indexed data allows network enabled image capture device 12 to provide digital media files and their indexed data directly to remote fulfillment centers such as third party web sites or kiosks that do not have the capability of computing such indexed data. In the case of a photo kiosk 26 that technically could perform the computation of the indexing process, the time required to compute the indexed data would take so long as to discourage a potential user of kiosk 26. To the user, this apparently real time or pseudo real time indexing provides a more fulfilling experience at a kiosk where indexing can provide a suggestion of the "best picture" to print based on the pre-computed and transferred index data. Many other user experiences can be designed and implemented for the benefit of shortening workflow and improving the experience with the kiosk when built upon this foundation of pre-indexed data.

In step 44, the original digital media files are updated with the transferred indexed data. Updating the original digital media files can include, but is not limited to, adding indexed data to the file header of the digital media file, adding the index data to a table in a database structure stored in the memory of the network enabled image capture device 12, or adding the indexed data in any other form that can be associated with the proper original high resolution digital media file.

Figure 3:
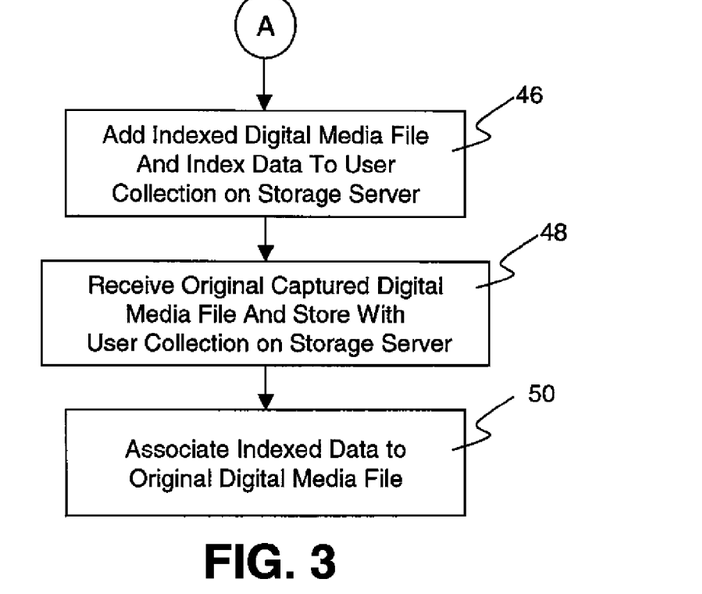
FIG. 3 is a flowchart illustrating an optional process for automatically adding digital media file and indexed data produced from the digital media file to a storage server operationally connected to a communication network.

FIG. 3 is a flowchart illustrating an optional process for automatically adding digital media file and indexed data produced from the digital media file to a storage server 20 operationally connected to a communication network 24. In FIG. 3, the illustrated flowchart has a starting point of point A in FIG. 2. Using the user identification code, the processed and transferred digital media file along with the resultant indexed data is transferred to user's collection within storage server 20 in step 46. At some point later in time, storage server 20 receives (step 48) the original high-resolution digital media file from network enabled image capture device 12. Since the processed and transferred digital media file is used to generate indexed data prior to the transfer and receipt of the high resolution digital media file, the processed and transferred digital media file is a temporary file that can be replaced upon receipt of the high resolution original digital media file by the storage server 20. System 10 may be configured to replace the processed and transferred digital media file with the original high resolution digital media file or it may be configured to retain the processed and transferred digital media file as a file useful for transferring to other device or systems, e.g., lower resolution files. In step 50, indexed data can be used to update the original high resolution digital media file by the storage server 20 as metadata stored in the EXIF header of the original high resolution digital media file or it may be linked to the original high resolution digital media file through a database structure.

Figure 4:
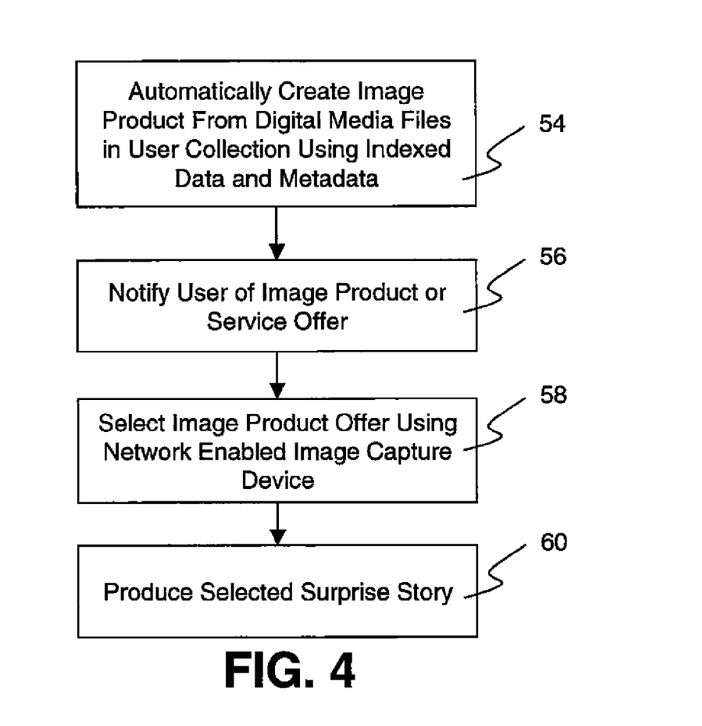
FIG. 4 is a flowchart illustrating a process for using processed, transferred and indexed digital media file(s) to render a photo product or service offer representing a story.

FIG. 4 is a flowchart illustrating a process for using processed, transferred and indexed digital media file(s) to render a photo product or service offer representing a story. Story generation server 28 operates on a plurality of digital media files stored on storage server 20 and associated with a user through the user identification code using a series of rules for the purposes of rendering (step 54) a potential image product or service representative of a story. The story may be rendered in such a manner as to be viewable on a portable consumer electronic device such as network enabled capture device 12 although the invention is not so limited. In step 56, the user is notified of the availability for viewing, purchase, sharing etc of the rendered image product as formed by story generation server 28. Upon accepting the invitation to view the story generated by story generation server 28, the user is presented with a rendering of the potential photo product or service created in step 54. During the viewing of the rendered potential photo product or service, the user can accept the offer (step 58) to purchase the rendered potential photo product or service. In step 60, the rendered potential photo product is actually converted into the product or service represented by the rendering. The now fulfilled product or service is then provided to or on behalf of the user who accepted the offer in step 56.

Figure 5:
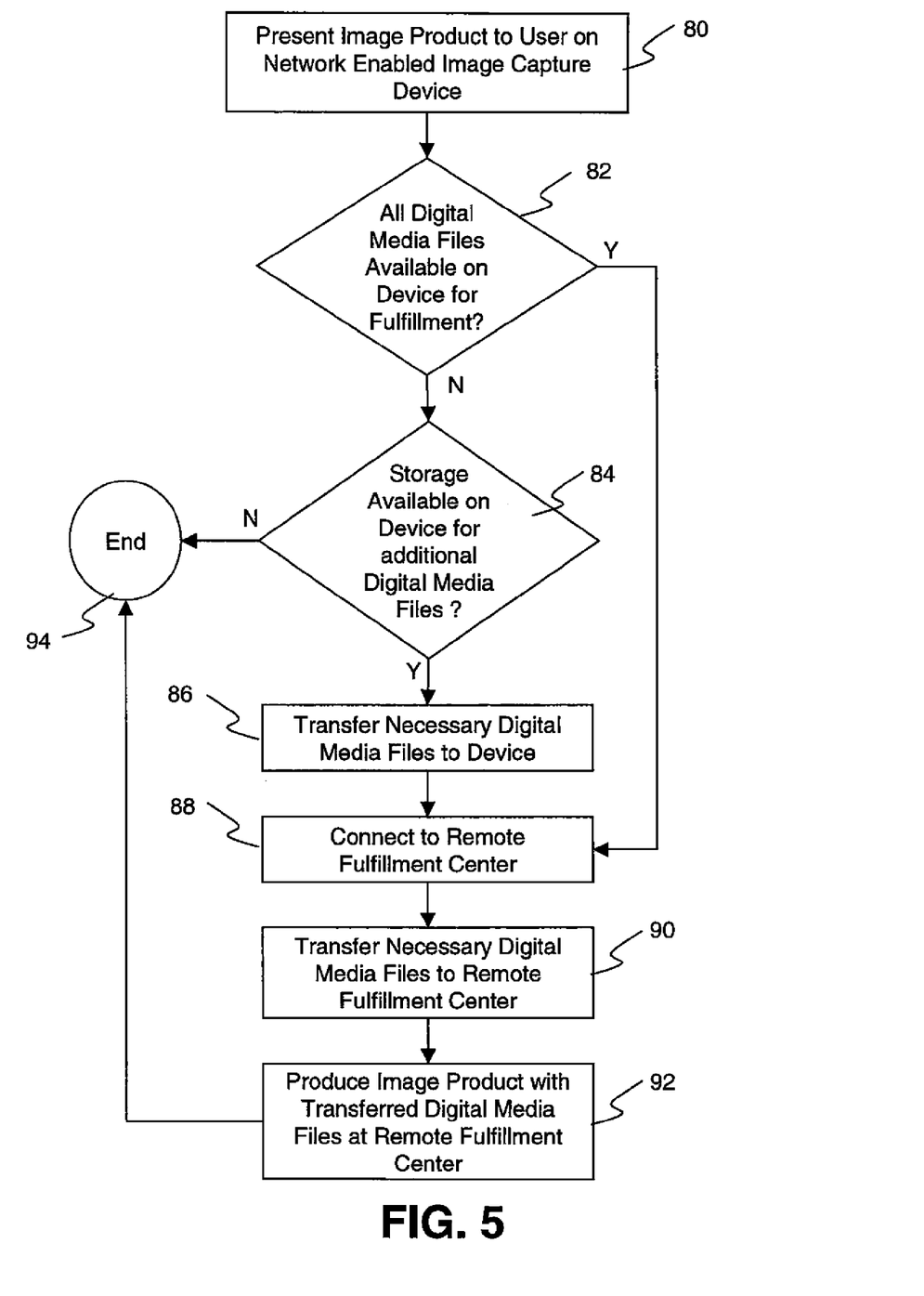
FIG. 5 is a flowchart illustrating additional functionality using remote indexing of digital media files.

FIG. 5 is a flowchart illustrating additional functionality using remote indexing of digital media files. In a similar process as depicted with respect to FIG. 2, a surprise or unsolicited story is prepared according to a set of story template rules and incorporates the user's indexed digital media files. In Step 82, the surprise story notification is pushed to a consumer electronic device such as the network enabled image capture device 12. Since the technique depicted in FIG. 5 is not limited by the indexing of files solely from network enabled image capture device 12, step 82 includes the provision to check the availability of the necessary files on the receiving network enabled image capture device 12. Step 84 insures that there is sufficient storage memory available on the network enabled image capture device 12 to receive additional digital media files. For example, a calendar may be automatically created in November for the coming year using digital media files present in the user's digital media collection in association with a user account or collection on storage server 20. The digital media files that are automatically chosen for the calendar can include some digital media files that were captured by network enabled image capture device 12 and which are resident thereon. The remainder of the digital media files used to create the calendar can be resident on storage server 20 but not on network enabled image capture device 12. Although, it is advantageous to have all the digital media files necessary to create the calendar on the network enabled image capture device 12, it is not necessary to do so.

Connecting to the storage server 20 via communication network 24, image capture device 12 receives the transfer of the necessary digital media files in step 86. At the appropriate time to fulfill the prepared surprise story, image capture device 12 connects to a remote fulfillment center in step 88 such as photo kiosk 26 and in step 90, transfers all the digital media files necessary to produce the surprise story tendered in step 80. In step 92, the surprise story is produced by the remote fulfillment center, photo kiosk 26, using the transferred digital media files. It will be understood that the product description and the appropriate production sequence will also be transferred to the remote fulfillment center 26 in the form of, for example, an XML file such as the Kodak Story-Share™ descriptor file described in U.S. Provisional Patent Application Ser. No. 60/870,976 entitled "Storyshare Automation" by Thiagarajah Arujunan et al., incorporated herein by reference. The process ends in step 94 if there is not enough memory on the network enabled image capture device 12 or if the image product is produced as offered.

Figure 6:
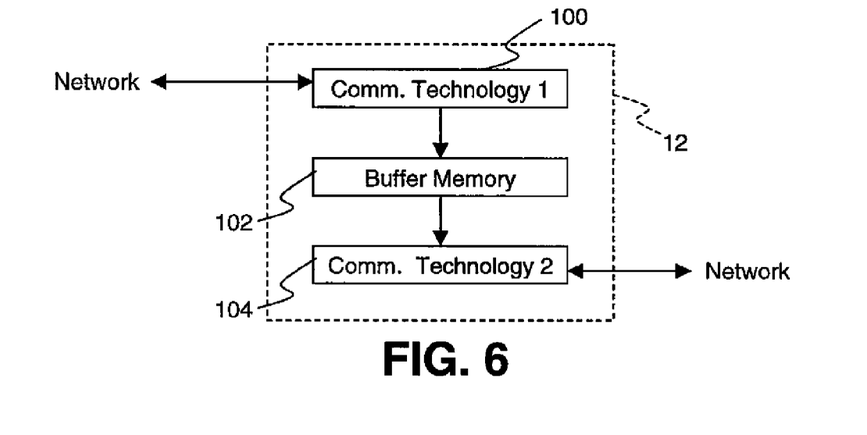
FIG. 6 is a flowchart illustrating one embodiment of a network enabled image capture device.

FIG. 6 is a flowchart illustrating one embodiment of a network enabled image capture device. Using the arrangement of communication radios and memory of the network enabled image capture device 12 shown in FIG. 6, the lack of available memory on the network enabled image capture device 12 terminating the process of FIG. 5 can be mitigated. As described with respect to steps 86-90, the network enabled image capture device 12 must communicate first with storage server 20 using a user identification code to retrieve all the necessary digital media files required to fulfill the prepared surprise story on the remote fulfillment center 26. The network enabled image capture device 12 must then transfer the necessary digital media files to the remote fulfillment center 26 including any digital media files already resident in the memory of network enabled image capture device 12 prior to receiving the additional digital media files from storage server 20. However, network enabled image capture device 12 typically includes multiple radios to connect with a wide range of devices. As previously mentioned network enabled image capture device 12 can include, but is not limited to, wi-fi, digital cellular, and Bluetooth™ radios. Photo kiosk 26, by contrast, typically only includes a single radio such as Bluetooth™, and it may or may not include a wired connection to communication network 24. In any event, photo kiosk 26 may not understand or allow communication network connections to third party storage server 20 for the purposes of retrieving necessary digital media files to use in the fulfillment of a product or service for a user.

With the configuration shown in FIG. 6, the network enabled image capture device 12 can act as a communication bridge and authentication manager between storage server 20 and remote fulfillment center 26. Using a first communication technology 100 such as a digital cellular technology, the network enabled image capture device 12 authenticates with and connects to storage server 20 receiving data packets and transferring them to a buffer memory 102 within the network enabled image capture device 12. Using a second communication technology 104 such as Bluetooth™, network enabled image capture device 12 transfers the data packets in the buffer memory 102 to the remote fulfillment center 26. Buffer memory 102 is sized appropriately to accommodate the data packet transfer between two technologies that operate at significantly different data transfer rates. The size of the buffer memory 102 is substantially less than required to receive a complete digital media file and index data. In this manner, data packet transfer occurs between two otherwise logically unconnected devices until all packets are received by the remote fulfillment center to produce the surprise story tendered.

Figure 7:
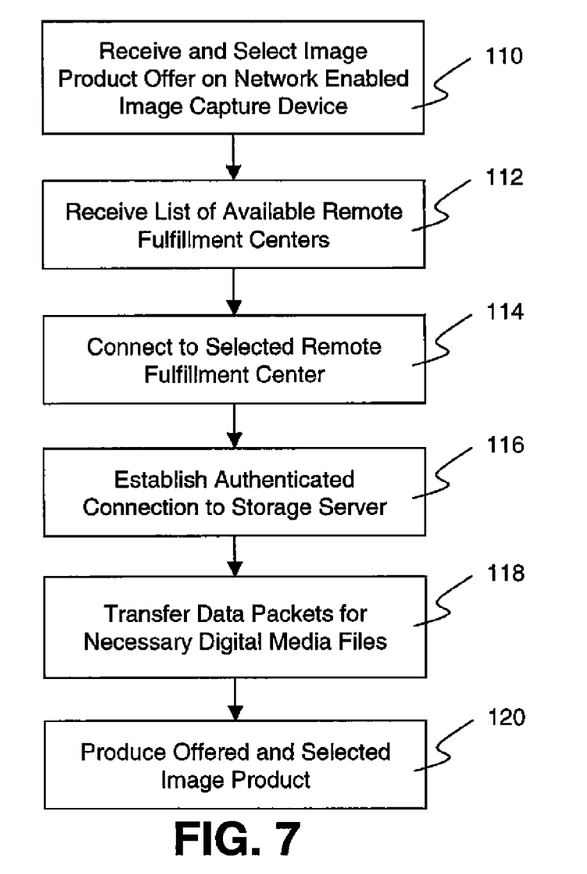
FIG. 7 is a flowchart illustrating one embodiment of a simplified process for transferring additional digital media files of a user stored on a network storage server by forming a communication bridge to a remote fulfillment center.

FIG. 7 is a flowchart illustrating one embodiment of a simplified process for transferring additional digital media files of a user stored on a network storage server 20 by forming a communication bridge to a remote fulfillment center 26. In this simplified process, a user receives and selects a product offer (step 110) using the network enabled image capture device 12. In step 112, the user also receives a list of remote fulfillment centers 26 that are capable of producing the selected product offer from the story generation server 28. This list can be further provided as a function of proximity to the user as determined by the location information commonly provided by network enabled image capture devices 12 in the form of triangulation between receiving cellular towers or an embedded GPS receiver. At a convenient time, a connection is made (step 114) to the selected remote fulfillment center 26 using the second radio 104 and the bridging connection is made (step 116) to storage server 20 using the first radio 100 for transferring (step 118) the data packets making up the digital media files necessary for producing the offered and selected product. The process concludes in step 120 with the remote fulfillment center using the digital media files to produce the offered product. It should be noted, that steps 114, 116 and 118 could be accomplished in a peer-to-peer network commonly understood in the art. In this arrangement, network enabled image capture device 12 provides the authentication to connect the two peers which connect for example the remote fulfillment center 26 to the storage server 20.

Figure 8:
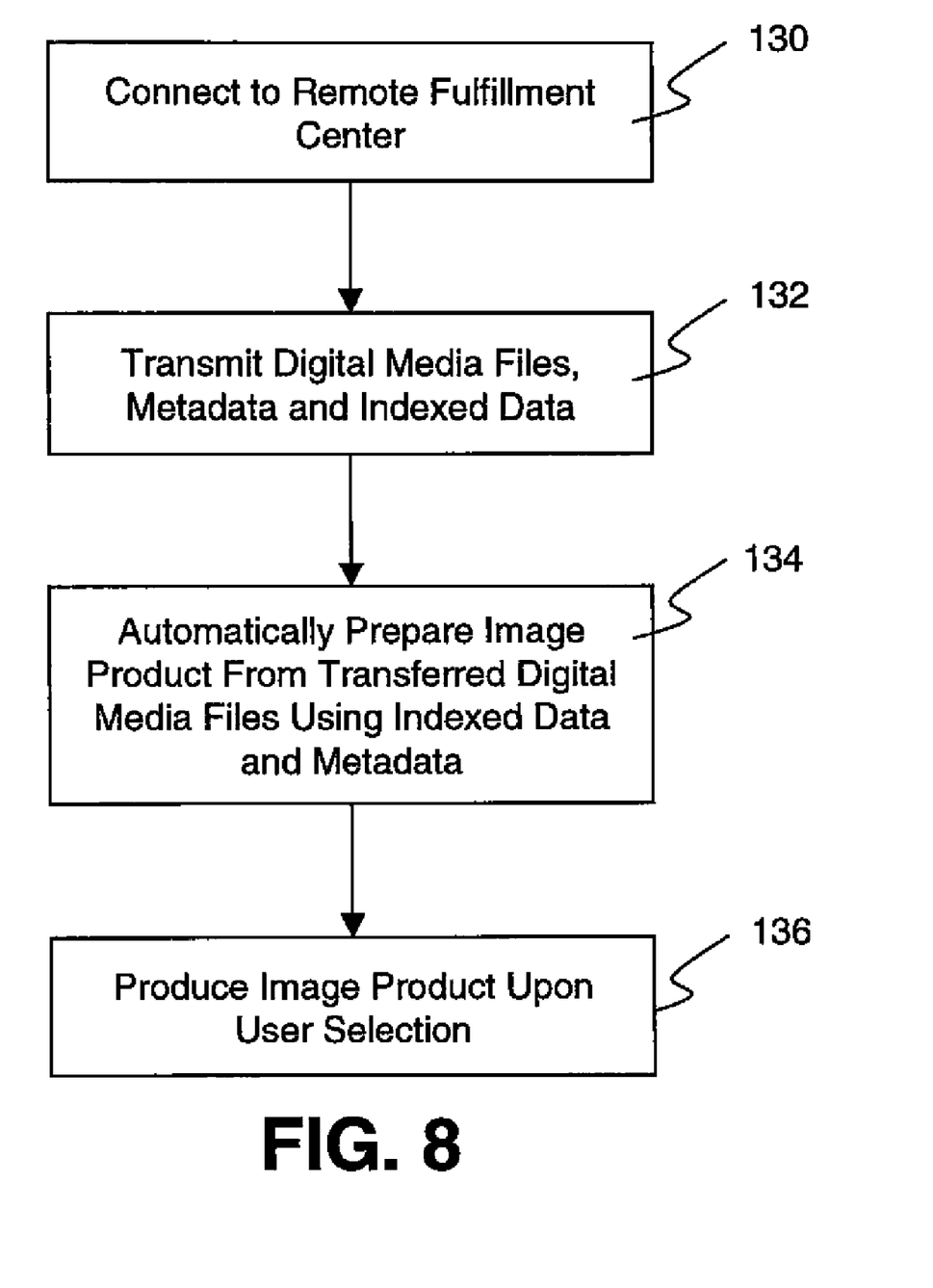
FIG. 8 is a flowchart illustrating a process that allows a user with indexed digital media files stored in networked enabled image capture device to connect to a remote fulfillment center.

FIG. 8 is a flowchart illustrating a process that allows a user with indexed digital media files stored in networked enabled image capture device to connect to a remote fulfillment center 26. In FIG. 8, a user with indexed digital media files stored in networked enabled image capture device 12 connects to a remote fulfillment center 26 (step 130). This connection is accomplished without any preconceived notion of available products to make or what files to use to make them, and have a product automatically prepared for them. After connecting to the remote fulfillment center 26, the network enabled image capture device transfers (step 132) a plurality of digital media files along with their indexed data to the fulfillment center 26. It will be assumed for the purposes of this example that metadata is transferred as part of the digital media file and that indexed data was produced by indexing server 18 and transmitted to network enabled image capture device 12. Remote fulfillment center 26 operates on the digital media files, metadata, and indexed data in a similar fashion to the operation of the story generation server 28 and produces an image product offer (step 134). Upon approval and selection by the user, the remote fulfillment center 26 produces (step 136) the selected image product for the user.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

PARTS LIST

| | PARTS LIST |
|---|---|
| 10 | system |
| 12 | image capture device |
| 16 | personal computer |
| 18 | indexing server |
| 20 | storage server |
| 22 | advertisement server |
| 24 | communications network |
| 26 | photo kiosk |
| 28 | story generation server |
| step 30 | capture digital media file |
| step 32 | process digital media file |
| step 34 | locate network |
| step 36 | transfers processed digital media file to indexing server |
| step 38 | transfer images to indexing server |
| step 40 | index processed and transferred digital media files |
| step 42 | transfer indexed data to network enabled image capture device |
| step 44 | original media files updated with transferred indexed data |
| step 46 | indexed media file and index data added to storage server |
| step 48 | original media file received and stored on storage server |
| step 50 | indexed data associated to original media file |
| step 54 | creating image product or service |
| step 56 | notify user of image product or service |
| step 58 | select image product |
| step 60 | fulfilled product or service |
| step 82 | digital media files available on device for fulfillment |
| step 84 | storage memory availability |
| step 86 | transfer of digital media files |
| step 88 | connect to remote fulfillment center |
| step 90 | transfer digital media files to fulfillment center |
| step 92 | image product produced at remote fulfillment center |
| step 94 | process ends |
| step 100 | communication technology |
| step 102 | buffer memory |

-continued

PARTS LIST

| step 104 | communication technology |
| step 110 | user receives and selects product |
| step 112 | user receives a list of fulfillment centers |
| step 114 | connect to remote fulfillment center |
| step 116 | connection made |
| step 118 | transfer of data packets |
| step 120 | offered product produced |
| step 130 | connect to remote fulfillment center |
| step 132 | transfer digital media files to fulfillment center |
| step 134 | image product offered |
| step 136 | image product selected |

The invention claimed is:

1. A method for pseudo real time indexing of digital media files, comprising:
    capturing at least one digital media file using a network enabled image capture device;
    connecting the network enabled image capture device to an indexing server over a network;
    transferring the at least one captured digital media file to the indexing server;
    indexing the at least one captured digital media file based on probabilistic data for producing indexed data associated with the at least one captured digital media file by:
        analyzing semantically the content of each digital media file; and
        classifying each digital media file based on probalistic data of the semantic content;
    transferring the indexed data associated with the at least one captured digital media file to the network enabled image capture device;
    updating the at least one digital media file on the network enabled image capture device with the indexed data;
    transmitting a plurality of the digital media files from the network enabled image capture device to a remote image-product fulfillment center, each digital media file having metadata and indexed probabilistic data of semantic content;
    using the metadata and indexed data to automatically render an image product using at least one of the plurality of digital media files; and
    producing the rendered image product by the remote image-product fulfillment center upon selection of the rendered image product by the user.

2. The method of claim 1 further comprising providing a user identification code for the network enabled image capture device.

3. The method of claim 1 further comprising processing the captured digital media file prior to transferring to the indexing server.

4. The method of claim 1 further comprising transmitting the indexed data associated with the at least one captured digital media file to an advertisement server.

5. The method of claim 4 further comprising providing semantically correlated advertisements from the advertisement server upon request from the indexing server or a personal computer.

6. The method of claim 1, further-including using a story generation server to operate on a plurality of digital media files for rendering a potential image product or service representative of a story.

7. The method of claim 6, further-including rendering the potential image product or service in such a manner as to be viewable on a portable consumer electronic device.

8. The method of claim 7, further-including extending an offer to a user to purchase the rendered image product or service.

* * * * *